Aug. 28, 1962    R. POUIT    3,051,413
VTOL AIRCRAFT

Filed Oct. 25, 1960    2 Sheets-Sheet 1

INVENTOR
Robert Pouit
BY
Bailey, Stephens & Huettig
ATTORNEYS

Aug. 28, 1962 R. POUIT 3,051,413
VTOL AIRCRAFT

Filed Oct. 25, 1960 2 Sheets-Sheet 2

INVENTOR
Robert Pouit
BY
Bailey, Stephens Huettig
ATTORNEYS

United States Patent Office 3,051,413
Patented Aug. 28, 1962

3,051,413
VTOL AIRCRAFT
Robert Pouit, 3 Rue Auguste Mayet, Asnieres, France
Filed Oct. 25, 1960, Ser. No. 64,755
Claims priority, application France Mar. 18, 1960
11 Claims. (Cl. 244—12)

The present invention relates to VTOL aircrafts.

It is already known to blow compressed air at suitable points of the profile of a wing intended to supply lift. This is done in order to improve the laminar flow along the wing profile and to achieve a great lift increase owing to the increase of circulation thus obtained. However, obviously, an increase of circulation can be obtained only if there is already a sufficient circulation along the wing profile. Up to now, such an initial circulation has been obtained only by giving the aircraft a translatory forward movement in the atmosphere. Therefore the devices above referred to did not make it possible to take off without running on the ground.

The chief object of my invention is to provide an aircraft which eliminates this apparent impossibility.

For this purpose, the aircraft according to my invention comprises, in combination with such air blowing and lift increasing means, nozzle means extending spanwise, i.e. transversely to the fore-and-aft direction of the aircraft and located ahead of and at a distance from the leading edge of the lift supplying wing for blowing a rearwardly flowing sheet of gaseous fluid toward said wing leading edge. And, as the thickness of a gaseous fluid sheet thus blown on the wing would be too small and its speed too high, the aircraft according to my invention further comprises means forming at least one air induction duct extending spanwise along said nozzle means and having a forwardly facing inlet and a rearwardly directed outlet adjacent to the outlet of the above mentioned nozzle means, whereby a great mass of air is driven along through said duct owing to the suction effect exerted by the driving fluid issuing from the nozzle means.

Owing to the large mass of fluid (induced air mixed with driving fluid) thus made to flow along the wing at a speed of the same order of magnitude as that of a conventional aircraft during its take off run, the lift increase means provided on the wing itself in combination with the local air blowing means of said wing are then capable of an effect sufficient to achieve vertical take off, or at least take off without preliminary run of the aircraft on the ground.

A preferred embodiment of the present invention will be hereinafter described with reference to the accompanying drawings, given merely by way of example and in which.

Figure 1:
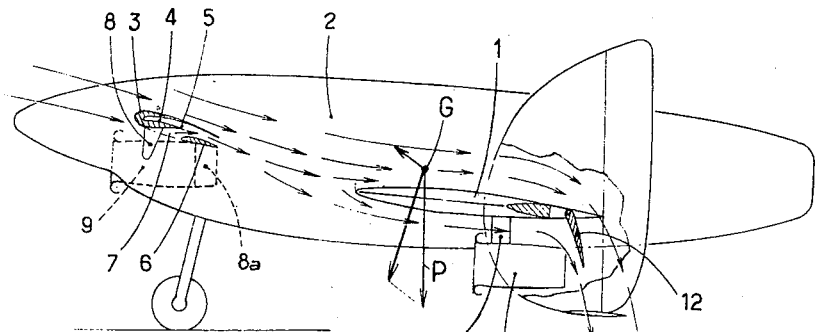
FIG. 1 is a side view of an aircraft according to my invention.
Figure 4:
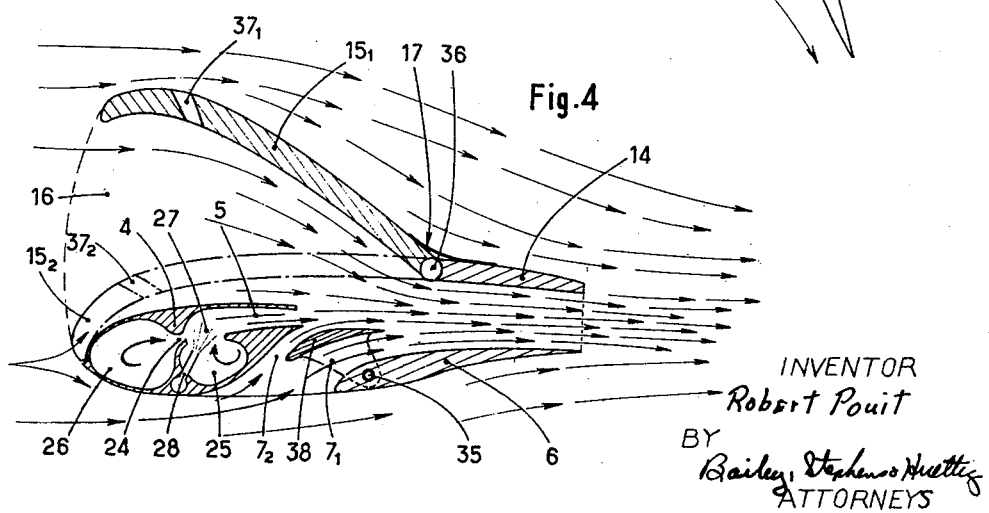
FIG. 4 is a vertical longitudinal section of the auxiliary wing, according to a modification.

The aircraft comprises a main supporting wing 1 fixed to a fuselage 2. This fuselage carries, ahead of wing 1 and preferably, as shown, slightly above it, an element 3 extending transversely to the fore-and-aft direction of the aircraft. This element comprises a conduit 4 extending parallel to the span of said wing, and the rear portion of which is provided with an outlet slot forming a rearwardly opening nozzle 5. Element 3 further comprises an under portion 6 arranged to leave, between itself and the upper portion of said element 3, at least one slot 7 (FIG. 1). Preferably, as shown by FIG. 4, there are two slots $7_1$ and $7_2$ between part 3 and the upper portion of element 3, owing to the provision of a flap 38 carried by part 6 and adjustable with respect thereto by pivoting about an axis 35. Thus element 3 constitutes a slotted auxiliary wing.

Means are provided for feeding conduit 4 with a fluid under pressure intended to be blown through nozzle 5 toward the main wing 1. Said means consist of generators 9 of fluid under pressure having their outputs connected to conduit 4 through conduits 8 (FIG. 1).

Figure 2:
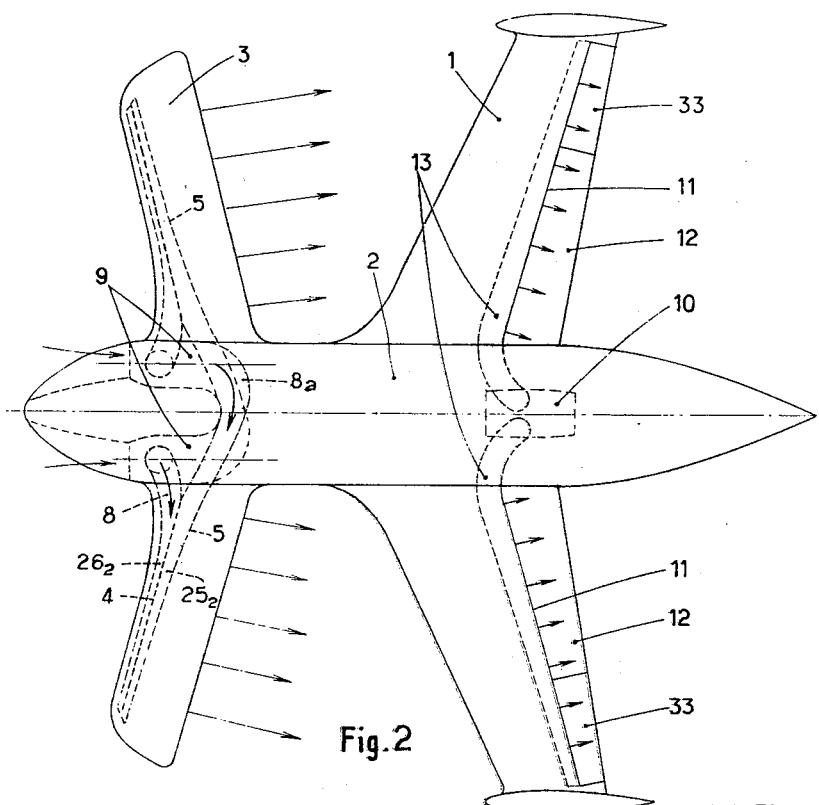
FIG. 2 is a corresponding plan view.
Figure 5:
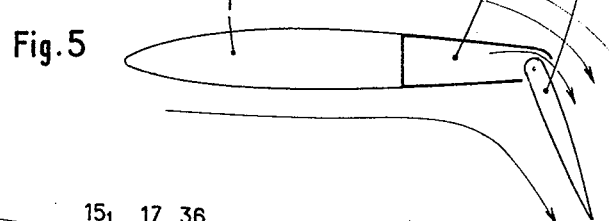
FIG. 5 is a diagrammatic vertical longitudinal section of the aircraft main wing.

A fluid under pressure supplied in any suitable manner, as it will be hereinafter described, is fed to conduits 13 extending in wing 1, in the general direction of its span, said conduits 13 opening to the outside through slots provided in the wing upper face and extending spanwise close to and ahead of the pivot axes 11 of rear flaps 12 mounted on said wing 1, as shown by FIGS. 1, 2 and 5. Such a local blowing of fluid on the wing surface, increasing circulation along the wing profile, achieves a considerable lift increase, the more so as flaps 12 are turned downwardly so as to deflect into the vertical direction the stream of air blown by front element 3 on wing 1.

As above stated, according to my invention, it is this external blowing from element 3 that creates along wing 1 the initial circulation which is to be increased by the local blowing of fluid through slots 11.

However, if said external blowing from element 3 were produced only by the fluid under pressure issuing from conduit 4 through nozzle 5, the sheet of fluid blown on wing 1 would be much too thin and its velocity would be too high. In order to obviate this drawback, according to my invention, element 3 includes air duct means adapted to cooperate with nozzle 5 acting by induction or suction on a great mass of air to drive it along toward wing 1. This mass of air and the sheet of driving fluid issuing at high speed from nozzle 5, and which has entrained said mass of air, are mixed together so as to supply both the desired great mass of fluid to be blown on wing 1 and the desired relatively low speed of said fluid mass.

Such air induction ducts are already constituted by slots 7, or $7_1$ and $7_2$, formed between parts 4 and 6 of element 3, some amount of air guided along the external walls of said parts being also induced by suction by nozzle 5. However, according to the preferred embodiment of my invention, illustrated by FIG. 4, the suction effect of nozzle 5 is further increased by making one of the aerodynamic surfaces of auxiliary wing, or element, 3 in the form of two flaps, to wit a rear one 14 which is fixed, and a front one capable of occupying either of two positions, an open one $15_1$ and a closed one $15_2$. When said front flap is in the closed position $15_2$ (shown in dotted lines) it forms with parts 4 and 6 an auxiliary lift producing wing (with fluid blown at its trailing edge). When said front flap is in the opened position $15_1$ (shown in solid lines) it forms, with the top surface of part 4, a big diffuser 16 through which a large mass of air sucked in by the fluid jet issuing from nozzle 5 travels at a speed increasing from front to rear before mixing with said jet. Advantageously, as shown by FIG. 4, a spring plate 17 riveted to the rear flap 14 is slidably applied against the front flap so as to improve the flow of air along flaps $15_1$ and 14.

The generators 9 which feed fluid under pressure to conduit 4 may be of any type. Advantageously, they are constituted by the jet engines serving to the propulsion of the aircraft in flight, the gas streams supplied by said engines being fed to conduit 4 to escape through nozzle 5.

In the particular embodiment illustrated by the drawing, each of the two turbo-jet engines supplies two separate streams of fluids under pressure, to wit a stream of turbine exhaust gases and a stream of compressed air consisting of the excess of air available in the compressor and which has not been fed to the combustion chamber. For instance such a turbo-jet engine comprises (FIG. 3) a low pressure compressor 20 coupled through a shaft 18 with a low pressure turbine 21 and a high pressure compressor 22 coupled through a shaft 19 with a high pressure turbine 23, the combustion chamber being between the output of compressor 22 and the intake of turbine 23. The first abovementioned fluid stream consists of the exhaust gases from turbine 23 whereas the second stream is the excess of air delivered by the first compressor 20 and which is not passed to the second compressor 22.

Now conduit 4 is divided by a partition provided with a slot 24 into two chambers 25 and 26. Chamber 25 is fed with the first fluid stream, i.e. the turbo-jet exhaust gases and chamber 26 is fed with the second fluid stream, i.e. the excess of air from the first stage compressor. This air stream flows out from chamber 26 through slot 24. Burners 28 opening into chamber 25 opposite said slot 4 may feed atomized fuel which, ignited by contact with the hot gases in chamber 25 is burned in the air flowing from chamber 26 through said slot 24, thus achieving an after-burning effect.

Figure 3:
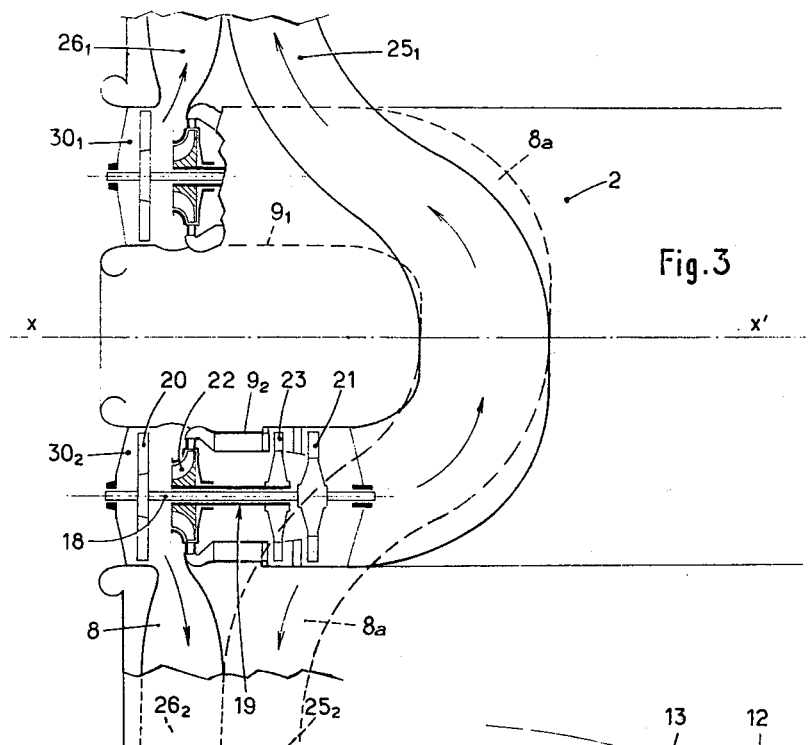
FIG. 3 is a diagrammatic vertical section of the front turbo-jet engines of this aircraft.

Advantageously, as shown by FIG. 3, on each side of the fore-and-aft vertical plane of symmetry X—X of the aircraft, one of the chambers, for instance $26_2$, is fed through a conduit 8a with the compressed air stream from one of the turbo-jet engines (for instance engine $9_2$ located on the same side of said symmetry plane and having its inlet at $30_2$) and the other chamber, in this case $25_2$ is fed through a conduit 8 with the exhaust gases from the other turbo-jet engine (in this case engine $9_1$ located on the other side of said plane X—X and having its inlet at $30_1$). Thus, in case of accidental stopping of one of the turbo-jet engines, both of the branches of conduit 4 (respectively located on the right and on the left of plane X—X) are fed with streams of fluid under pressure (compressed air on one side and exhaust gases on the other side), and it is possible to restore equality of the blowing effects of said streams by adjusting the amount of fuel fed to burners 28.

The air to be supplied to conduits 13 for exerting the local blowing action on wing 1 may be obtained in any suitable manner. Since turbo-jet engines $30_1$ and $30_2$ deliver streams of compressed air, they may be used to supply conduits 13. However, preferably, as shown by the drawing, I provide, at the lower part of fuselage 2, under wing 1, a generator of fluid under pressure 10 capable of having its output connected with conduits 13. Advantageously, this generator 10 is a turbofan as described with reference to engines $30_1$ and $30_2$. In this case, the compressed air stream from turbo-jet engine 10 is sent to conduits 13, whereas the gas flow from said engine 10 can be either made to flow out horizontally in normal flight conditions to supply propulsion or deflected vertically in the downward direction by means of a jet deflector (not shown), in vertical flight conditions, to supply additional lift.

Finally, to ensure longitudinal stability of the aircraft, at least one of the rear flaps of the auxiliary wing 3, for instance one of flaps 6 and 14, is pivotable about a corresponding transverse axis (35 and 36 respectively).

Operation of an aircraft as illustrated by the drawing results clearly from the above description. It should be noted that, as a rule, the injection of fuel through burners 28 (FIG. 4) to obtain an after-burning effect will be reserved for take off, landing and very low speeds flights, when a high lift is essential.

On the contrary, when the aircraft is flown at high speed, propulsion is ensured on the one hand by the fluid jets from the front engines $30_1$ and $30_2$, from the trailing edge of the auxiliary front wing and on the other hand by the jet of exhaust gases from the rear engine 10 and by the reaction of the air blown on the upper face of wing 1.

Concerning the front wing 3, the obtainment of a laminar flow therealong will be improved despite the fact that this wing is relatively thick, by providing, in the front portion of the flap shown in positions $15_1$ and $15_2$ in FIG. 4, orifices such as shown at 37 ($37_1$ and $37_2$) for sucking in the friction layer through the suction action of the jet flowing out at the trailing edge of said wing 3.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A VTOL aircraft which comprises, in combination, a lift supplying wing, nozzle means extending transversely of the fore-and-aft axis of said aircraft and fixed with respect to said wing ahead of and at a distance from the leading edge thereof for blowing a rearwardly flowing sheet of gas toward said wing leading edge, means carried by said wing for feeding gas under pressure to said nozzle means, means carried by said nozzle means forming at least one air induction duct having a forwardly facing inlet and a rearwardly directed outlet adjacent to said nozzle means outlet for causing an air mass to be driven from the atmosphere by suction by said gas sheet toward said wing whereby the relatively small mass of gas issuing as a high speed jet from said nozzle means causes a relatively big mass of air to be driven toward said wing at lower speed, gas blowing means carried by said wing for increasing circulation along the profile thereof, and lift increase means carried by said wing.

2. A VTOL aircraft which comprises, in combination, a lift supplying wing, nozzle means extending transversely of the fore-and-aft axis of said aircraft and fixed with respect to said wing ahead of and at a distance from the leading edge thereof for blowing a rearwardly flowing sheet of gas toward said wing leading edge, means carried by said wing for feeding gas under pressure to said nozzle means, means carried by said nozzle means forming at least one air induction duct having a forwardly facing inlet and a rearwardly directed outlet adjacent to said nozzle means outlet for causing an air mass to be driven from the atmosphere by suction by said gas sheet toward said wing whereby the relatively small mass of gas issuing as a high speed jet from said nozzle means causes a relatively big mass of air to be driven toward said wing at lower speed, gas blowing means carried by said wing for increasing circulation along the profile thereof, and a rear flap mounted on said wing to deflect in a downward direction the fluid stream flowing therealong.

3. A VTOL aircraft which comprises, in combination, a main lift supplying wing, nozzle means extending transversely to the fore-and-aft axis of said aircraft and fixed with respect to said wing ahead of and at a distance from the leading edge thereof for blowing a rearwardly flowing sheet of gas toward said wing leading edge, means fixed with respect to said main wing for feeding gas under pressure to said nozzle means, an auxiliary lift producing wing mounted around said nozzle means, air induction means carried by said auxiliary wing and forming at least one air induction duct having a forwardly facing inlet and a rearwardly directed outlet adjacent to said nozzle to cause an air mass to be driven from the atmosphere by suction by said gas sheet toward said wing whereby the relatively small mass of gas issuing as a high speed jet from said nozzle means causes a relatively big mass of air to be driven toward said wing at lower speed, gas blowing means carried by said main wing for increasing circulation along the profile thereof, and a rear flap mounted on said main wing to deflect in a downward direction the fluid stream flowing therealong.

4. An aircraft according to claim 3 in which said air induction means carried by said auxiliary wing comprise a movable front element of said auxiliary wing capable of occupying either of two different positions with respect to said last mentioned wing, to wit one in which it is expanded outwardly to form with the remainder of said last mentioned wing a rearwardly convergent diffuser and one in which it is folded on said remainder of said last mentioned wing to form therewith a streamlined structure.

5. A VTOL aircraft which comprises, in combination, a main lift supplying wing, nozzle means extending transversely to the fore-and-aft axis of said aircraft and fixed with respect to said wing ahead of and at a distance from the leading edge thereof for blowing a rearwardly flowing sheet of gas toward said wing leading edge of said wing, means carried by said main wing for feeding gas under pressure to said nozzle means, an auxiliary lift producing wing mounted around said nozzle means, air induction means carried by said auxiliary wing and forming at least one air induction duct having a forwardly facing inlet and a rearwardly directed outlet adjacent to said nozzle to cause an air mass to be driven from the atmosphere by suction by said gas sheet toward said wing whereby the relatively small mass of gas issuing as a high speed jet from said nozzle means causes a relatively big mass of air to be driven toward said wing at lower speed, said main wing comprising a rear flap pivotally mounted on the body of said main wing to deflect in a rearward direction the fluid stream flowing therealong, means in said main wing forming a gas chamber extending in the thickness of said wing transversely to the fore-and-aft direction of the aircraft, said chamber having an outlet slot opening through the upper surface of said wing onto the upper surface of said flap at the front part thereof.

6. An aircraft according to claim 3 in which said means for feeding gas under pressure to said nozzle means comprise a combustion chamber, a turbine having its intake in communication with said chamber, the outlet of said turbine being in communication with said nozzle means, an air compressor driven by said turbine and having an output opening into said combustion chamber and another output connected with said nozzle means, whereby said nozzle means is fed both with exhaust gases from said turbine and with air from said compressor, and means for burning fuel in the air fed from said compressor to said nozzle means.

7. An aircraft according to claim 3 in which said means for feeding gas under pressure to said nozzle means comprise two gas generator units respectively located on opposite sides of the vertical and fore-and-aft plane of symmetry of said aircraft, each of said units comprising a combustion chamber, a turbine having its intake in communication with said chamber, the outlet of said turbine being in communication with the portion of said nozzle means located on one side of said plane of symmetry, an air compressor driven by said turbine and having an output opening into said combustion chamber and another output connected with the portion of said nozzle means located on the other side of said plane of symmetry, whereby each of said nozzle means portions is fed both with exhaust gases from the turbine of one of said units and with air from the compressor of the other unit, and means for burning fuel in the air streams fed from said compressors to said nozzle means portions.

8. An aircraft according to claim 3 in which said means for feeding gas under pressure to said nozzle means comprise at least one turbo-jet engine mounted on said aircraft for propulsion thereof in normal flight conditions and means for sending at least a portion of the gas under pressure supplied by said engine to said nozzle means for vertical flight of said aircraft.

9. An aircraft according to claim 3 comprising a turbofan engine mounted on said aircraft for propulsion thereof in normal flight, and means for conveying the compressed air stream supplied by said turbofan engine to said gaseous fluid blowing means.

10. An aircraft according to claim 3 in which said air induction means carried by said auxiliary wing comprise at least one flap pivotally mounted with respect to said nozzle means about an axis perpendicular to the fore-and-aft direction of the aircraft, for controlling the longitudinal stability thereof.

11. An aircraft according to claim 4 in which said movable front element of said auxiliary wing is provided with a hole for suction of air therethrough.

References Cited in the file of this patent
UNITED STATES PATENTS
1,389,797 Thompson _____ Sept. 6, 1921